Dec. 24, 1968  S. F. ALLINA  3,418,005
GARDEN CART AND LINER BAG ASSEMBLY
Filed Aug. 28, 1967
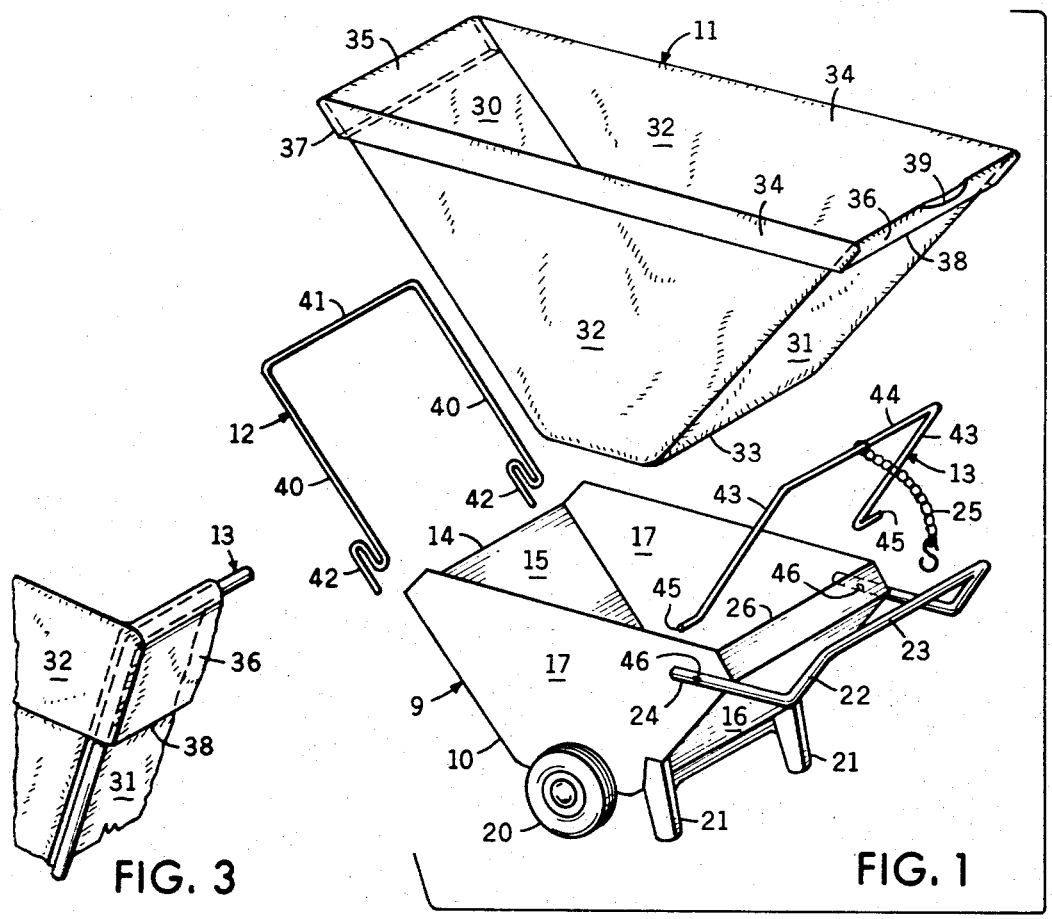
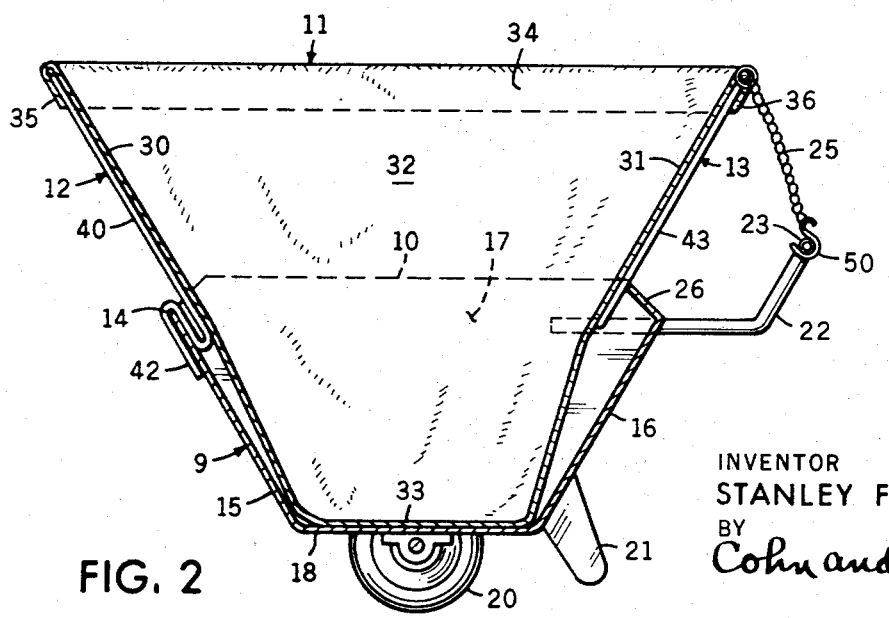
INVENTOR
STANLEY F. ALLINA
BY
Cohn and Powell
ATTORNEYS

United States Patent Office 3,418,005
Patented Dec. 24, 1968

3,418,005
GARDEN CART AND LINER BAG ASSEMBLY
Stanley F. Allina, Ladue, Mo., assignor to The Perfection Manufacturing Company, St. Louis, Mo., a corporation of Missouri
Filed Aug. 28, 1967, Ser. No. 663,688
12 Claims. (Cl. 280—47.26)

ABSTRACT OF THE DISCLOSURE

The cart includes a top-open container. Inverted U-shaped frames extend upwardly and outwardly above the front and rear ends of the container to provide support means for opposite ends of a liner bag disposed in the container. The frames are received in bottom-open pockets formed on the bag. The liner bag includes a pair of downwardly tapered walls, and a lower portion compatibly shaped to fit the container. The liner bag as a whole increases in cross-sectional area upwardly to provide an overall capacity substantially greater than that of the container alone.

Background of the invention

This invention relates generally to a garden cart and more particularly to a cart having a detachable liner bag for carrying grass, leaves and the like.

The work to be done in a garden or yard, which involves the use of a cart, can be broken down into two broad categories. The first category involves the carrying of heavy and often sharp-cornered objects such as rocks, logs, and garden implements. Carts used for this purpose obviously have to be stoutly constructed, and inevitably this construction will either be in sheet metal or wood. In such a cart, a large capacity is not usually desirable, partly because the material and equipment to be carried is relatively heavy, and partly because a large cart is unwieldy.

The other category of yard work involving the use of a cart is the transporting of leaves, grass and other such lightweight bulky material. Because of the character of this material, it is desirable to have a lightweight cart with a large capacity, and yet one from which the material can be discharged without difficulty.

In meeting the specifications involved in the two categories of work discussed above, the choice presented to the yard worker is that of having two carts, each adapted to cater to its specific category or, alternatively, one cart which is convertible in nature. The present cart and liner bag assembly is concerned with this second alternative.

The type of cart with which the present liner bag is intended to be used is basically a wheelbarrow. Such carts are in common use because of their sturdy nature and compact size. The relatively small size is of course a disadvantage when it comes to carrying lightweight, bulky materials such as leaves and grass. Fitting the cart container with a liner bag of substantially the same size is obviously of limited service. The present assembly utilizes the small cart as the basic wheeled conveyor for transporting a selectively detachable and collapsible liner bag of much larger capacity. The bag is shaped as to provide a non-linear increase in capacity as the depth of material increases.

This liner bag, together with the supporting means which enable the bag to be attached to the cart, is novel and provides functional advantages that are not afforded by the heretofore conventional carts.

Summary of the invention

The invention comprises essentially a cart including a top-open container in which a top-open liner bag is disposed. The bag has a substantially increased capacity over that of the cart.

A support means, by which the liner bag is held in position, includes a plurality of arms extending upwardly from the cart. The arms are attached at one extremity to the cart and at the other extremity to the liner bag. Preferably, a pair of arms are provided at each end of the cart, each pair of arms being interconnected laterally by a crossbar to form an inverted, substantially U-shaped frame.

The cross sectional area of the liner bag increases upwardly, and each frame is outwardly inclined to accommodate the resulting increased capacity of the liner bag.

The connection at the lower end of each arm of the U-shaped frames includes a couple means which prevents swinging movement of the frames outwardly from the operative disposition when the liner bag is in a fully-open position. The couple means is provided at one end of the cart by hooks at the lower extremity of each arm. At the other end of the cart, the lower extremities of the arms are pivotally connected to the cart, and the cart includes stops means which coact with the arms to provide a resistance couple preventing pivotal rotation of the arm outwardly from the fully-open position of the liner bag.

The liner bag includes external pocket means into which the upper ends of the arms interfit for attachment to the bag. The pocket means, which are provided at each end of the liner bag, are elongate to accommodate the upper ends and crossbar of the inverted U-shaped frames.

A flexible interconnection means between one end of the liner bag a fixed point on the cart, prevents inadvertent collapse of the bag from its open position.

Brief description of the drawing

FIG. 1 is an exploded view of the cart, liner bag and supporting arms;

FIG. 2 is an enlarged, longitudinal cross-sectional view through the cart and the liner bag in an operational position, and FIG. 3 is an enlarged fragmentary view of one upper corner of the liner bag, illustrating the construction of the pocket.

Description of the preferred embodiment

Referring now by characters of reference to the drawing, and first to FIG. 1, it will be understood that the cart and liner bag assembly includes a cart generally indicated by 9 having a substantially trapezoidal-shaped top-open container 10. A top-open liner bag 11, likewise substantially trapezoidal in shape, but having a capacity considerably greater than the container 10, is disposed in container 10. Frames 12 and 13, each having an inverted U-shaped configuration, are provided at each end of the cart 9 to support the liner bag 11.

From FIG. 2, it can be seen that the container 10 has upwardly and outwardly inclined front and rear walls 15 and 16 respectively. The walls 15 and 16 are interconnected by a pair of opposing side walls 17 and a bottom wall 18. The container 10 is mounted on a pair of ground wheels 20. A pair of rearwardly disposed stub legs 21 enable the cart 9 to be stabilized in a rest position. A handle 22 is provided at the rear of the cart 9 for the convenience of the operator. The handle 22 provides a crossbar 23 for the attachment of a chain 25. The chain 25 constitutes a link means for maintaining the liner bag 11 in an open position as will be later described.

It will be observed that the front wall 15 is provided with a substantially unobstructed upper margin 14 to facilitate the unloading of material. It will be further observed that the rear wall 16 is provided with an inturned cross panel 26 which cooperates with the frame 13 in a manner also to be later described.

The liner bag 11, as is clearly shown in FIGS. 1 and 2, includes inclined front and rear walls 30 and 31 respectively, extending upwardly and outwardly above the container 10, a pair of substantially parallel and opposed side walls 32 and a bottom wall 33. The various walls are joined together along their edges to form a top-open bag. The liner bag 11, which is preferably constructed of canvas or other flexible material includes elongate flaps 34 reinforcing the upper margins of each side wall 32. Elongate flaps 35 and 36, are disposed along the upper edges of the front and rear walls 30 and 31 respectively. The flaps 35 and 36 have a common upper margin with their associated walls 30 and 31 respectively, and are closed at their ends to provide external bottom-open pockets 37 and 38. An opening 39 is provided along the common margin of the rear wall 31 and the flap 36 which afford access into the pocket 38.

The inverted U-shaped frame 12, located at the front end of the cart 9, includes a pair of upwardly extending arms 40 interconnected at their upper ends by a crossbar 41. The lower end of each arm 40 is bent to form a S-shaped hook 42, constituting a spring clip. The outwardly opening loop of each hook 42 is clipped over the upper margin 14 of the front wall 15. The hook 42 cooperates with the front wall 15 to provide a resistance couple preventing swinging movement of the frame 12 counterclockwise (FIG. 2) toward the horizontal. The upper portion of the frame 12, including the crossbar 41, is detachedly received and held in the pocket 37 at the front wall 30 of liner bag 11, the frame 12 thereby supporting the front end of liner bag 11.

The U-shaped frame 13 includes a pair of upwardly extending arms 43 interconnected at their upper ends by a crossbar 44. At their lower ends, each arm 43 includes an outwardly turned foot 45. The width of the frame 13 at its lower end, including the feet 45, is greater than the width between the side walls 17 of the container 10. Thus, by springing the frame 13 at its lower end, the feet 45 may be pivotally located and retained in holes 46 provided through each side wall 17. Pivotal rotation of the frame 13 in a clockwise direction is, as can be clearly seen from FIG. 2, prevented by the stop means provided by the upper margin of the cross panel 26. Because the stop means coacts with each arm 43 at a point disposed radially from the pivot axes defined by the holes 46, a resistance couple is provided which prevents pivotal rotation of the arm clockwise, toward the horizontal.

The link means provided by the chain 25 is attached by a ring to the crossbar 44 of the frame 13, and is provided with a hook 50 at its free end so that it may be conveniently and selectively attached to the crossbar 23 of the handle 22. It will be clear that the chain 25 could be attached by a ring to the crossbar 23 of handle 22. The hook 50 would then be attached to the crossbar 44 of the frame 13.

It is thought that the functional advantages of this cart and liner bag assembly have become fully apparent from the foregoing description of parts, but for completeness of disclosure, the installation and usage of the liner bag will be briefly described.

The frame 12 is fitted to the front wall 15 of the container 10 by simply clipping the outwardly opening loops, provided by the hooks 42 at the ends of arms 40, over the upper margin 14 of the front wall 15. The orientation of the hooks 42 is such that the frame 12 acts as an extension of and above the inclined wall 15.

The frame 13 is sprung into position and, although not fully aligned with the rear wall 16, the frame 13 acts as an extension of and above the inclined wall 16. Thus, because of the inclination, the upper ends of frames 12 and 13 are considerably farther apart than the lower ends of the frames.

The upper ends of the frames 12 and 13 are disposed to support opposing ends of the liner bag 11 above the top level of container 10. The liner bag 11 is attached to each frame 12 and 13 by the simple expedient of slipping the upper portions of each frame 12 and 13, including its respective crossbar, into its associated pocket 37 or 38 at one end of the liner bag 11. The bag 11 will fit into the container 10. It will be clear that the chain 25 may very easily be pulled through the opening 39 provided in the rear wall pocket 38 and hooked to the handle crossbar 23.

Because of the tapered configuration of the liner bag 11, its capacity is considerably greater than that of the container 10. In the present embodiment for example, in which the depth of the liner bag 11 is approximately twice that of the container 10, the capacity of the liner bag 11 is between three and four times the capacity of the container 10.

Moreover, the general shape of the liner bag 11 is similar to that of the container 10, and consequently, the lower portion of the bag 11 is compatible with the interior of the container 10. The walls of the container 10 provide peripheral support for the lower portion of the bag 11. This support is of considerable assistance in the prevention of bulging, and therefore splitting of the bag 11 under heavily loaded conditions.

It will be clear that the liner bag 11, because of the flexible nature of the material from which it is made, is not only detachable but collapsible. In order to prevent inadvertent collapse of the bag, the chain 25 provides a link between the upper margin of the bag 11 and the handle 22. The liner bag 11 is thus maintained in an open position. Because of the pivotal nature of the frame 13, the chain 25 may be unhooked and the frame 13 pivoted about its lower end in a counterclockwise direction (FIG. 2). This facilitates the removal of the liner bag 11 from the interior of the container 10, and partly collapses the liner bag 11 for easy removal of the contents.

I claim as my invention:

1. A garden cart and liner bag assembly, comprising:
   (a) a cart including a top-open container,
   (b) a liner bag in the container,
   (c) a plurality of arms attached to the cart and extending upwardly from the container, and
   (d) means on the liner bag attached to the arms,
   (e) the arms supporting the bag and holding the bag open to provide an expanded capacity relative to the capacity of the container,
   (f) the liner bag including an upwardly and outwardly inclined wall extending above the container to increase the capacity of said container.

2. A garden cart and liner bag assembly as defined in claim 1, in which:
   (g) at least one of the upwardly projecting arms is inclined substantially parallel with and engages the inclined wall of the liner bag for support.

3. A garden cart and liner bag assembly as defined in claim 1, in which:
   (g) at least one of the upwardly projecting arms is inclined substantially parallel with and engages the inclined wall of the liner bag for support above the container, and
   (h) the container includes an inclined wall substantially parallel with and engaging the inclined wall of the bag for support.

4. A garden cart and liner bag assembly as defined in claim 1, in which:
   (g) the arms are attached at their lower ends to the cart to provide a couple inhibiting swinging movement of the arms in an outward direction.

5. A garden cart and liner bag assembly as defined in claim 1, in which:
   (g) at least one arm includes a hook at its lower end preventing swinging movement of the arm in an outward direction.

6. A garden cart and liner bag assembly as defined in claim 1, in which:
   (g) at least one arm has its lower end pivotally connected to the cart, and (h) the cart includes stop means coacting with the arm at a point disposed radially from the pivotal connection of the lower arm end to provide a resistance couple preventing pivotal rotation of the arm in an outward direction.

7. A garden cart and liner bag assembly as defined in claim 1, in which:
(g) at least two arms are interconnected at their upper ends to provide an inverted, substantially U-shaped frame, and
(h) the attachment of the frame to the cart includes couple means inhibiting swinging movement of the frame about its lower arm ends in a downward direction.

8. A garden cart and liner bag assembly as defined in claim 1, in which:
(g) the liner bag includes pocket means receiving and holding the upper end of at least one of the arms.

9. A garden cart and liner bag assembly as defined in claim 1, in which:
(g) at least two arms are interconnected at their upper ends by a crossbar to provide an inverted, substantially U-shaped frame, and
(h) the liner bag includes an external, bottom-open pocket receiving and holding the upper arm ends and crossbar of the inverted U-shaped frame.

10. A garden cart and liner bag assembly as defined in claim 1, in which:
(g) at least two arms are interconnected at their upper ends to provide an inverted, substantially U-shaped frame,
(h) the lower arm ends of the frame are pivotally connected to the cart,
(i) the cart includes stop means coacting with the frame at a point disposed radially from the pivotal connection of the lower arm ends to provide a resistance couple preventing pivotal rotation of the frame in an outward direction, and
(j) link means interconnect the frame and the cart to inhibit pivotal rotation of the frame in an inward direction thereby maintaining the bag in an open position.

11. A garden cart and liner bag assembly as defined in claim 1, in which:

(g) the container includes upwardly and outwardly inclined opposed end walls,
(h) the liner bag includes upwardly and outwardly inclined, opposed end walls,
(i) a pair of arms project upwardly from each end of the cart above the container,
(j) a crossbar interconnects each pair of arms at their upper ends to provide an inverted, substantially U-shaped frame at each end of the cart,
(k) each frame is connected at its lower arm ends by couple means to the cart to inhibit swinging movement of the frame in an outward direction, the frames being divergently oriented with respect to each other, and
(l) the front and rear walls of the liner bag include external bottom-open pocket means receiving and holding the upper arm ends and crossbar of its associated frame, thereby to support the liner bag.

12. A garden cart and liner bag assembly as defined in claim 11, in which:
(m) the lower arm ends of one frame are provided with spring clips selectively gripping the upper margin of one end wall of the container,
(n) the lower arm ends of the other frame are pivoted to container, while the said other frame engages the upper margin of the other end wall of the container, and
(o) a link means selectively interconnects the pivoted frame to the cart to preclude pivotal movement of the frame in a direction to collapse the bag.

References Cited
UNITED STATES PATENTS

| | | | |
|---|---|---|---|
| 2,504,907 | 4/1950 | Truran | 280—47.26 |
| 2,803,491 | 8/1957 | Brown | 296—39 |
| 3,162,460 | 12/1964 | Davidson | 280—34 |
| 3,330,575 | 7/1967 | Boudreau | 280—36 |

BENJAMIN HERSH, *Primary Examiner.*

L. D. MORRIS, JR., *Assistant Examiner.*

U.S. Cl. X.R.

280—34; 296—39